June 21, 1960 T. J. WEAVER 2,941,416
SHIFTING LEVER
Filed Nov. 24, 1958
2 Sheets-Sheet 1

Truman J. Weaver
INVENTOR.

June 21, 1960
T. J. WEAVER
2,941,416
SHIFTING LEVER
Filed Nov. 24, 1958
2 Sheets-Sheet 2
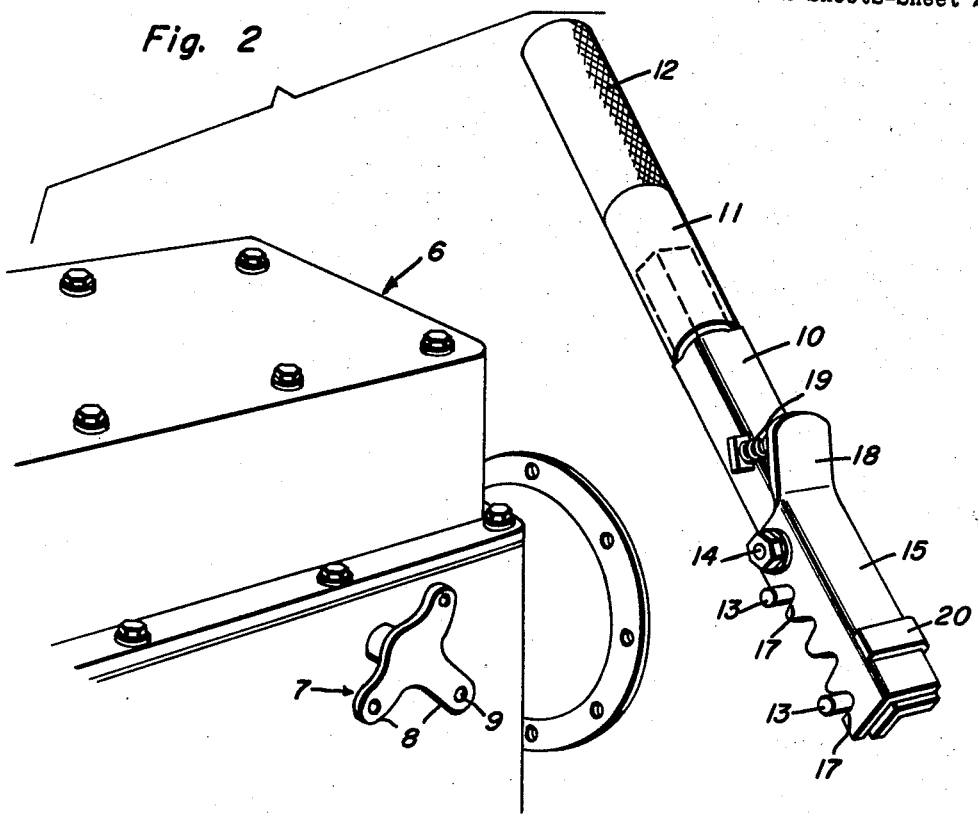
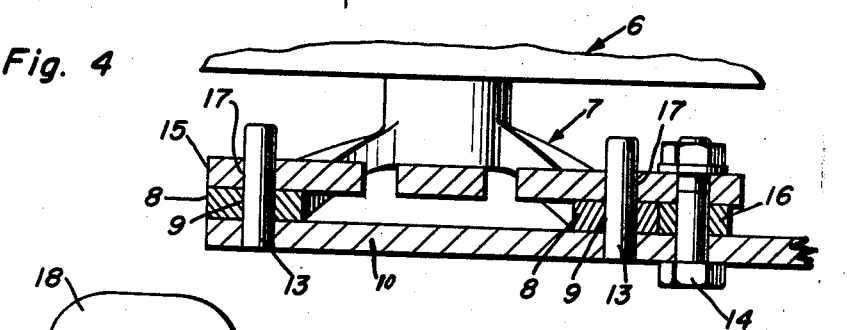
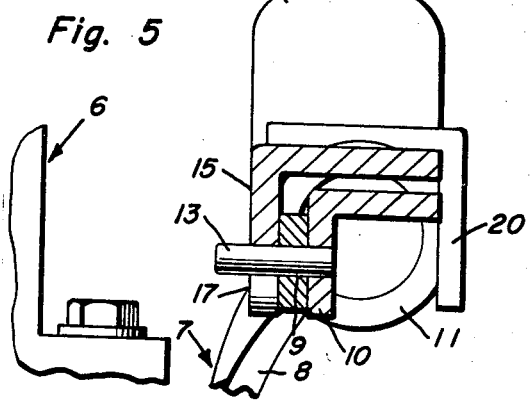
Truman J. Weaver
INVENTOR.
BY

United States Patent Office 2,941,416
Patented June 21, 1960

2,941,416

SHIFTING LEVER

Truman J. Weaver, P.O. Box 231, Annandale, Va.

Filed Nov. 24, 1958, Ser. No. 776,043

7 Claims. (Cl. 74—523)

This invention relates to new and useful improvements in automotive mechanics' tools and has for its primary object to provide, in a manner as hereinafter set forth, novel means for shifting between forward and reverse the hydro-torque transmission of an engine which has been removed from the vehicle, whereby the mechanic may feel the familiar "snap," as the gears are shifted to these positions to assist in checking for thrust in the main shaft.

Another very important object of the present invention is to provide a shifting lever of the aforementioned character which may be quickly applied to the usual coupling of the transmission regardless of the position of said coupling.

Still another important object of the invention is to provide a shifting lever of the character described which embodies novel means for securely locking the tool in position for use on the transmission.

Other objects of the invention are to provide a transmission shifting lever or tool of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a perspective view, showing the tool removed from the transmission;

Figure 4 is a longitudinal sectional view, taken substantially on the plane indicated by the section line 4—4 of Figure 3; and Figure 5 is a view in transverse section, taken substantially on the plane indicated by the section line 5—5 of Figure 1.

Figure 1:
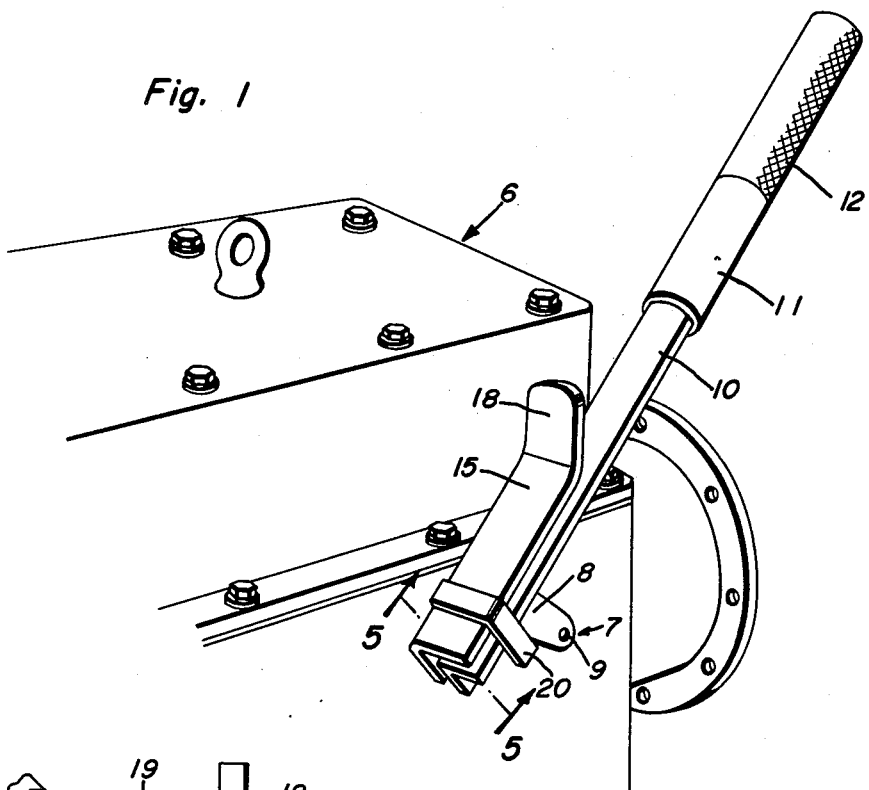
Figure 1 is a perspective view, showing a tool embodying the present invention in position on a transmission.
Figure 3:
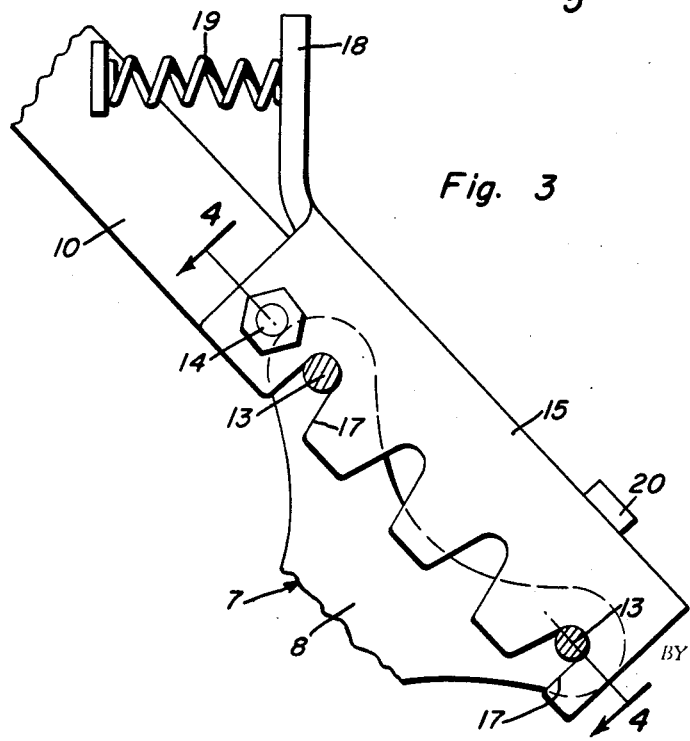
Figure 3 is a view in side elevation of one end portion of the tool, showing the same applied to the transmission with the pins in cross-section.

Referring now to the drawing in detail, it will be seen that reference character 6 designates generally a portion of a conventional hydro-torque transmission which has been removed from the chassis of a motor vehicle. Reference character 7 designates the usual coupling member of the transmission 6 to which the shifting means of the vehicle is ordinarily connected. The member 7 is of the spider-type, said member comprising legs 8 having openings 9 in the free end portions thereof.

The embodiment of the present invention which has been illustrated comprises an angle bar 10 of suitable metal, which bar may also be of any desired dimensions. Fixed on one end portion of the bar 10 and projecting longitudinally therefrom is a tubular metallic handle 11. The handle 11 is knurled, as indicated at 12. Projecting laterally from the other end portion of the bar 10, at longitudinally spaced points, is a pair of metallic pins 13. The pins 13 are engageable in any two of the openings 9 of the conventional coupling member 7 for operatively connecting the device to the transmission 6.

Pivotally secured at 14 on one side of the forward end portion of the bar 10, see Figure 2 in particular, is a lock 15 of angle iron. A spacing washer or ring 16 is mounted on the pivot bolt 14 between the bar 10 and the lock 15. The lock 15 is engageable behind the coupling 7 for securing the bar 10 thereon with the pins 13 engaged in the openings 9. Toward this end, the lock 15 has formed therein recesses or notches 17 which accommodate the pins 13 when said lock is in operative position. Projecting from the pivoted end of the lock 15 is a thumb lever 18. A coil spring 19 on the bar 10 is engaged beneath the thumb lever 18 for yieldingly urging the lock 15 toward operative position.

It is thought that the use of the tool will be readily apparent from a consideration of the foregoing. Briefly, through the medium of the lever 18, the lock 15 is swung upwardly to inoperative position on its pivot 14 against the tension of the spring 19. The bar 10 is then brought into side-abutting engagement with the member 7 with the pins 13 engaged in a pair of the openings 9. The construction and arrangement is such that the pins 13 may be engaged in a pair of the openings 9 regardless of the position of the coupling 7. The lever 18 is then released for permitting the spring 19 to actuate the lock 15 to operative position behind the coupling 7, thus positively securing the tool in position, the notches or recesses 17 receiving the pins 13. The tool is then swung in either direction for rotating the coupling member and thereby shifting the transmission 6 between forward and reverse positions in an obvious manner. Of course, to remove the tool from the transmission the lock 15 is again swung to raised or inoperative position. Reference character 20 designates a metallic L-shaped guide on the free end portion of the lock 15, which guide is slidable on the forward end portion of the bar 10. The member 20 also functions as a brace or reenforcement for the forward end portion of the pivoted lock 15.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shifting lever for transmissions of the type including a shifting mechanism comprising a rotatable coupling connected to the shifting mechanism of the transmission and disposed on the exterior of the transmission casing and having spaced openings therein, said lever comprising: a bar engageable laterally with the front of the coupling, pins on the bar engageable in the openings for operatively connecting the bar to said coupling, and means for securing the bar to the coupling with the pins engaged in the openings.

2. A shifting lever for transmissions of the type including a shifting mechanism comprising a rotatable coupling connected to the shifting mechanism of the transmission and disposed on the exterior of the transmission casing and having spaced openings therein, said lever comprising: a bar engageable laterally with the front of the coupling, pins on the bar engageable in the openings for operatively connecting the bar to said coupling, and means for securing the bar to the coupling with the pins engaged in the openings, said means including a locking lever pivotally mounted on the bar and engageable behind the coupling for clamping the coupling between said bar and locking lever.

3. A shifting lever for transmissions of the type including a shifting mechanism comprising a rotatable coupling connected to the shifting mechanism of the transmission and disposed on the exterior of the transmission casing and having spaced openings therein, said lever comprising: a bar engageable laterally with the front of the coupling, pins on the bar engageable in the openings for operatively connecting the bar to said coupling, and means for securing the bar to the coupling with the pins engaged in the openings, said means comprising a locking lever pivotally secured at one end to the bar and engageable behind the coupling for securing said bar thereto with the pins engaged in the openings, an operating lever on the pivoted end of said locking lever, and a spring on the bar engaged with said operating lever for yieldingly urging the locking lever toward operative position.

4. A shifting tool for transmissions of the type including a shifting mechanism comprising a rotatable coupling connected to the shifting mechanism of the transmission and disposed on the exterior of the transmission casing and having spaced openings therein, said tool comprising: a bar engageable laterally with the front of the coupling, lateral pins on the bar engageable in the openings for operatively connecting said bar to the coupling, and a lock for releasably securing the bar against the coupling with the pins engaged in the openings, said lock including a bar having one end portion pivotally secured to the first named bar, the second named bar being spaced from the first named bar and engageable behind the coupling, said second named bar having notches therein for the reception of the pins when said second named bar is in operative position, a guide on the free end portion of the second named bar operable on the first named bar, a lever on the pivoted end portion of the second named bar for swinging the same to inoperative position, and a spring on the first named bar engaged beneath said lever for yieldingly urging the second named bar toward operative position.

5. The combination of claim 2 wherein said locking lever has notches therein for the reception of said pins when the latter are inserted through said openings.

6. The combination of claim 1 wherein said bar and said locking lever are each L-shaped in cross-section and are pivotally connected in nested relation.

7. The combination of claim 6 including a guide on said securing means slidably and guidingly engaging said bar.

References Cited in the file of this patent
UNITED STATES PATENTS

| | | |
|---|---|---|
| 212,660 | Christy | Feb. 25, 1879 |
| 542,330 | Bryden | July 9, 1895 |
| 2,676,505 | Goodnight | Apr. 27, 1954 |
| 2,830,480 | Brame | Apr. 15, 1958 |

FOREIGN PATENTS

| | | |
|---|---|---|
| 404,910 | Great Britain | Jan. 25, 1934 |